UNITED STATES PATENT OFFICE.

MORGAN K. ARMSTRONG, OF WINNETKA, ILLINOIS.

PLASTIC MIXTURE AND PROCESS FOR MAKING THE SAME.

1,331,554.   Specification of Letters Patent.   Patented Feb. 24, 1920.

No Drawing.   Application filed July 2, 1919. Serial No. 308,312.

*To all whom it may concern:*

Be it known that I, MORGAN K. ARMSTRONG, a citizen of the United States, and a resident of Winnetka, county of Cook, and State of Illinois, have invented certain new and useful Improvements in Plastic Mixtures and Processes for Making the Same; and I do hereby declare that the following is a full, clear, and exact description thereof.

This invention relates to an improved plastic mixture and to the process for making the same and consists of the matters hereinafter described and more particularly pointed out in the appended claims.

The object of the invention is to produce a novel and useful plastic mixture more particularly adapted for use as a body or filler for plaster wall boards, for molded forms and the like. The new plastic mixture is much cheaper and more economical to produce than are mixtures now used for like purposes, and at the same time, it will, upon drying, harden to a degree having the requisite strength and the necessary adhesive qualities.

The improved plastic mixture includes as one of its ingredients, a full clay or a soil containing a comparatively large proportion of clay. To properly prepare the clay or soil, so that it is suitable for use as such ingredient, it is first deflocculated as follows. I mix the clay or soil in its natural state, with water (preferably warm water). The clay or soil of the desired amount is placed in a suitable receptacle and the water is thoroughly incorporated with it,—the water being added in sufficient quantity to make a thick, creamy mixture of the consistency of what is known in the art as a "clay slip". An electrolyte is then added,—preferably sodium phosphate. The sodium phosphate is added in the form of a weak solution, and is stirred thoroughly into the "clay slip".

The electrolyte, in this case sodium phosphate, not only acts as an efficient aid to defloeculation of the insoluble constituents of the clay, but it also acts to precipitate the greater part of the soluble constituents of the clay, thereby bringing them into suspension in the mix. Thus, the sodium phosphate may be said to act both as a deflocculating agent, and as a flocculating agent. The electrolyte is added in an amount sufficient to precipitate the greater part of the soluble constituents of the clay. This will generally vary with different clays or soils containing clay, and the amount in each case may be determined by experiment.

After, or during, the process of deflocculation, a very small percentage (one-half to three-fourths of one per cent.) of some organic colloid such as starch or dextrin, is added and thoroughly dissolved in the mixture.

The product thus made may be produced in large quantities and placed in suitable receptacles wherein it is kept on hand, ready for use when needed, to make the improved plastic mix.

When desired for use in a plastic mix for making plaster board, molded products or the like, finely ground, calcined gypsum is added to the clay mix taken from the stock produced as above, and the two are thoroughly mixed together. The plastic mix is then ready for immediate use, as for example, on a machine for making plaster board, or for use in making molded forms or the like. The amount of calcined gypsum added depends upon the purpose for which the plastic mix is to be used. In the case of the use of the plastic mix in making plaster board, the proportions of the clay mix and of calcined gypsum are 40% of gypsum and 60% of the clay mix.

In drying the plastic mix, after it has been incorporated in the plaster board, or has been molded into forms, to drive off the surplus water, any of the usual methods may be used for the purpose, but care must be taken to drive off the surplus water only, and the mix must not be submitted to a temperature that will recalcine the gypsum.

The combined water of the hydrates of the clay mix, as well as the water contained in the mix, provide the water for hydrating the gypsum, when the plastic mix is being used for any of its intended purposes. The organic colloid, in this case, dextrin, retards the drying of the plastic mix and thus allows time for slower and better crystallization to take place.

I claim as my invention:

1. The process of making a plaster mixture which consists in deflocculating clay or clay soil in a fluid, in the presence of an electrolytic agent, and of adding to and mixing with the deflocculated mass, finely ground, calcined gypsum.

2. The process of making a plaster mixture which consists in deflocculating clay or clay soil, reducing the same to the consistency of a clay slip, of adding an electrolyte adapted to precipitate the soluble constituents of the clay mix, of adding an organic colloid, and of then thoroughly incorporating in the mixture, finely ground, calcined gypsum.

3. A composition of matter including clay or soil particles which have been deflocculated in a fluid containing an electrolytic agent, and finely ground, calcined gypsum.

4. A composition of matter for the purpose set forth, including deflocculated clay or soil particles, and an electrolytic agent, and an organic colloid mixed with finely ground, calcined gypsum.

In testimony that I claim the foregoing as my invention, I affix my signature in the presence of two witnesses, this 30th day of June, A. D., 1919.

MORGAN K. ARMSTRONG.

Witnesses:
T. H. ALFREDS,
D. DARRENOUGUE.